(12) United States Patent
Horton

(10) Patent No.: US 10,419,435 B2
(45) Date of Patent: *Sep. 17, 2019

(54) SYSTEM AND METHOD FOR IMPLEMENTING A TWO-PERSON ACCESS RULE USING MOBILE DEVICES

(71) Applicant: AT&T Intellectual Property I, L.P., Atlanta, GA (US)

(72) Inventor: Michael R. Horton, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 13 days.

This patent is subject to a terminal disclaimer.

(21) Appl. No.: 15/441,325

(22) Filed: Feb. 24, 2017

(65) Prior Publication Data

US 2017/0163656 A1  Jun. 8, 2017

Related U.S. Application Data

(63) Continuation of application No. 14/944,560, filed on Nov. 18, 2015, now Pat. No. 9,621,556, which is a
(Continued)

(51) Int. Cl.
*H04L 29/06* (2006.01)
*H04W 12/08* (2009.01)
*H04W 4/02* (2018.01)

(52) U.S. Cl.
CPC .......... *H04L 63/10* (2013.01); *H04L 63/0861* (2013.01); *H04L 63/107* (2013.01);
(Continued)

(58) Field of Classification Search
CPC ...... H04W 12/12; H04W 12/06; H04W 12/08; H04W 88/02; G06F 21/88; G06F 2221/2111; G06F 21/31; G06F 21/32
See application file for complete search history.

(56) References Cited

U.S. PATENT DOCUMENTS 6,226,383 B1    5/2001  Jablon
6,691,232 B1 *  2/2004  Wood .................. H04L 63/0815
                                                            726/18
(Continued)

FOREIGN PATENT DOCUMENTS

EP    2605172 A2     6/2013
WO    WO0177896 A1   10/2001
WO    WO2007106679 A2 9/2007

OTHER PUBLICATIONS

Jansen, Wayne A. "Determining Privileges of Mobile Agents", Computer Security Applications Conference, 2001, ACSAC 2001, Proceedings 17th Annual. IEEE, 2001.
(Continued)

*Primary Examiner* — Ernest G Tacsik

(57) ABSTRACT

A system using mobile devices and a network provides access authentication, authorization and accounting to computing resources using a two-person access rule solution approach. A central access control server coordinates a rule-based authorization process in which a requesting user and one or more authorizing users are engaged in real-time communications to facilitate approved access to a sensitive resource. The technique utilizes mobile cellular interfaces and location service technologies, while also providing traditional security control measures of voice and visual verification of user identities.

13 Claims, 10 Drawing Sheets

Related U.S. Application Data continuation of application No. 14/086,458, filed on Nov. 21, 2013, now Pat. No. 9,232,402.

(52) U.S. Cl.
CPC .............. *H04L 63/12* (2013.01); *H04L 63/20* (2013.01); *H04L 65/1069* (2013.01); *H04W 4/02* (2013.01); *H04W 12/08* (2013.01)

(56) References Cited

U.S. PATENT DOCUMENTS

| | | |
|---|---|---|
| 6,766,007 B1 | 7/2004 | Dermier et al. |
| 6,934,838 B1 | 8/2005 | Boyce et al. |
| 7,743,409 B2 | 6/2010 | Gonzales et al. |
| 7,921,289 B2 | 4/2011 | Teijido et al. |
| 8,001,381 B2 | 8/2011 | Metke et al. |
| 8,087,068 B1 | 12/2011 | Downey et al. |
| 8,151,364 B2 | 4/2012 | Hewitt et al. |
| 8,161,283 B2 | 4/2012 | Metke et al. |
| 8,209,740 B1 | 6/2012 | Kulaga et al. |
| 8,275,356 B2 | 9/2012 | Hickie |
| 8,281,129 B1 * | 10/2012 | Asghari-Kamrani ....................... G06F 21/31 705/74 |
| 2002/0040439 A1 | 4/2002 | Kellum |
| 2002/0094777 A1 * | 7/2002 | Cannon ................ H04L 63/107 455/41.2 |
| 2002/0184217 A1 | 12/2002 | Bisbee et al. |
| 2004/0022390 A1 | 2/2004 | McDonald et al. |
| 2005/0223008 A1 | 10/2005 | Kubota et al. |
| 2008/0133930 A1 | 6/2008 | Moshir et al. |
| 2009/0089882 A1 * | 4/2009 | Hofmann ............... H04N 7/163 726/28 |
| 2011/0041159 A1 | 2/2011 | Tripathi et al. |
| 2011/0181414 A1 | 7/2011 | Coimbatore et al. |
| 2012/0066749 A1 | 3/2012 | Taugbol et al. |
| 2012/0102549 A1 * | 4/2012 | Mazzaferri ......... G06F 21/6218 726/4 |
| 2012/0254963 A1 | 10/2012 | Sanchin et al. |
| 2013/0267204 A1 * | 10/2013 | Schultz ................ H04W 12/06 455/411 |
| 2014/0164761 A1 * | 6/2014 | Kufluk ................... H04L 63/10 713/155 |
| 2015/0128240 A1 * | 5/2015 | Richards .............. H04L 63/0861 726/7 |

OTHER PUBLICATIONS

Blaze, Matt, and Angelos D. Keromytis, "The KeyNote Trust-Management System Version 2," 1999.

Rahman, Hafiz Abdur, and Konstantin Beznosov, "SPAPI: A Security and Protection Architecture for Physical Infrastructure and Its Deployment Strategy Using Wireless Senor Networks", Emerging Technologies and Factory Automation, 2005, ETFA 2005, 10th IEEE Conference on vol. IEEE, 2005.

Zurko, Mary Ellen, "User-centered Security: Stepping Up to The Grand Challenge", Computer Security Applications Conference, 21st Annual, IEEE, 2005.

\* cited by examiner

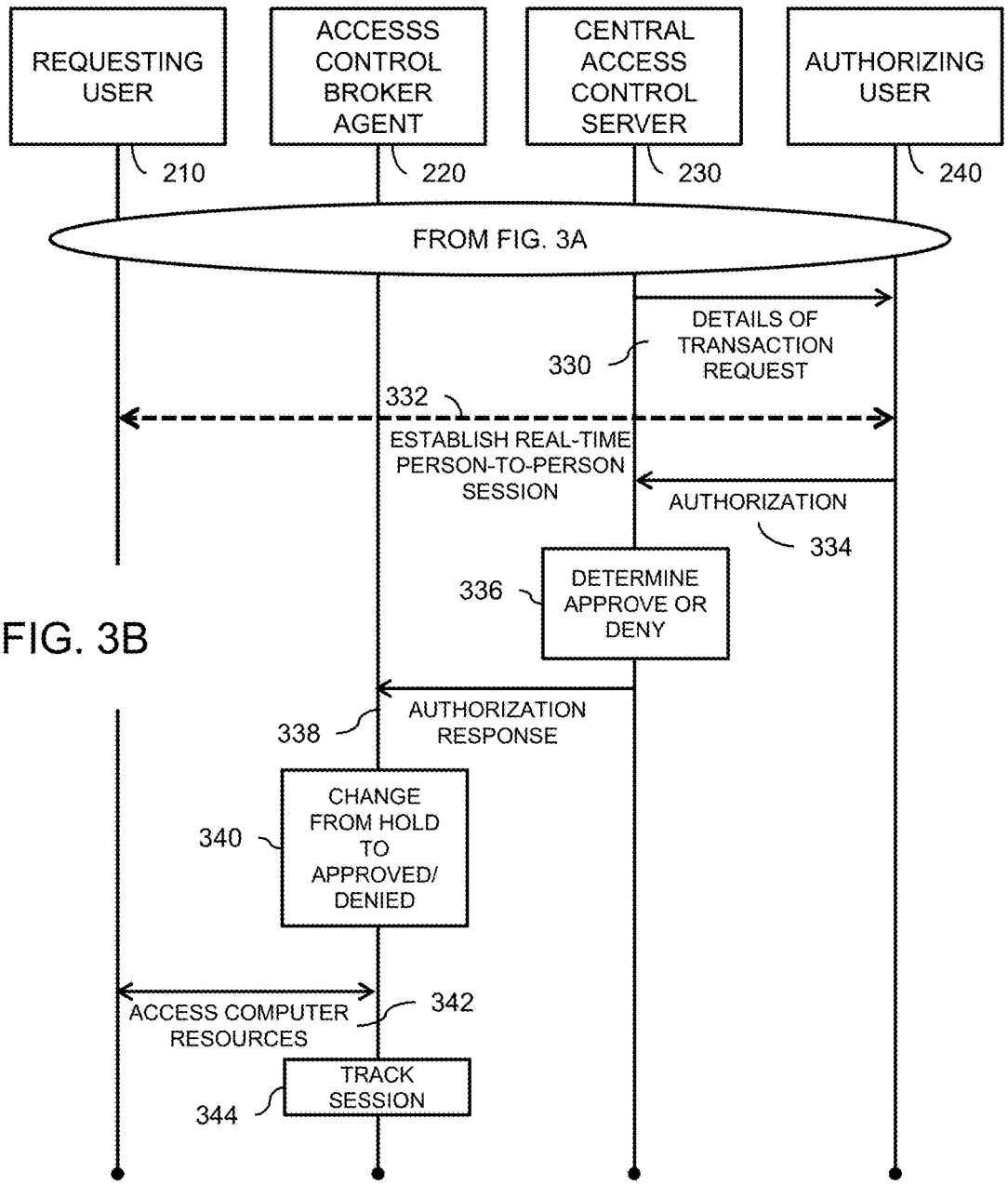

SYSTEM AND METHOD FOR IMPLEMENTING A TWO-PERSON ACCESS RULE USING MOBILE DEVICES

CROSS REFERENCE TO RELATED APPLICATIONS

This application is a continuation of U.S. patent application Ser. No. 14/944,560, entitled "SYSTEM AND METHOD FOR IMPLEMENTING A TWO-PERSON ACCESS RULE USING MOBILE DEVICES," filed on Nov. 18, 2015, issued as U.S. Pat. No. 9,621,556 on Apr. 11, 2017, which is a continuation of U.S. patent application Ser. No. 14/086,458, entitled "SYSTEM AND METHOD FOR IMPLEMENTING A TWO-PERSON ACCESS RULE USING MOBILE DEVICES," filed on Nov. 21, 2013, issued as U.S. Pat. No. 9,232,402 on Jan. 5, 2016, the disclosures of which are incorporated herein by refers in their entirety.

TECHNICAL FIELD

The present disclosure relates to access security for computer resources. More specifically, the disclosure is directed to the implementation of a two-person access rule using mobile devices.

BACKGROUND

Given the increasing risk of insider security breaches, and the increasing frequency of internal systems breaches, there is a need for a useful and secure two-person authorization capability for allowing a user to access to the most sensitive computing resources.

SUMMARY

In an exemplary embodiment of the present invention, there is provided a method for granting access to a resource. The method may performed by a central access authorization system. The method includes receiving from an access control broker agent a request to grant authorization for a requestor to access a resource; establishing a secure data connection between the central access authorization system and an authorizer mobile app running on an authorizing user mobile device; transmitting via the secure data connection to the authorizer mobile app at least an identity of the requestor and an identity of the resource; establishing a real-time person-to-person communications connection between the requestor and the authorizing user mobile device; receiving via the secure data connection an authorization message from the authorizer mobile app; and, based on the authorization message and based on rules associated with the resource, transmitting to the access control broker a message granting access to the resource by the requestor.

The operations may additionally include receiving from the authorizer mobile app geolocation data pertaining to the authorizing user mobile device, in which case the rules associated with the resource include a rule pertaining to the geolocation data. The real-time person-to-person communications connection between the requestor and the authorizing user mobile device may be selected from a text connection, a voice connection and a video connection based on rules for the particular resource.

The requesting user device may be a mobile device, in which case the operations may further include receiving from the requesting user device geolocation data pertaining to the requesting user device, and in which case the rules associated with the resource include a rule pertaining to the geolocation data.

The method may additionally comprise determining a biometric indicator from the real-time person-to-person communications connection between the requestor and the authorizing user mobile device, in which case the operation of transmitting to the access control broker a message granting access to the resource by the requestor is further based on the biometric indicator.

The real-time person-to-person communications connection between the requestor and the authorizing user mobile device may be a voice connection or a video connection.

The method may further comprise generating an authorization request session identifier for processing the request to grant authorization for a requestor to access a resource, and transmitting to the authorizer mobile app a digitally signed contact message including the authorization request session identifier.

Another aspect of the disclosure is a central access authorization system comprising a processor, a wide area network interface connected to the processor, and a computer readable storage device having stored thereon computer readable instructions that, when executed by the processor, cause the processor to perform operations as described above.

Another aspect of the disclosure is a tangible computer-readable medium having stored thereon computer readable instructions for granting access to a resource, wherein execution of the computer readable instructions by a processor causes the processor to perform operations as outlined above.

BRIEF DESCRIPTION OF THE DRAWINGS

FIGS. 3A and 3B show a schematic timing chart of operations according to one aspect the present disclosure.

DETAILED DESCRIPTION

Figure 1:
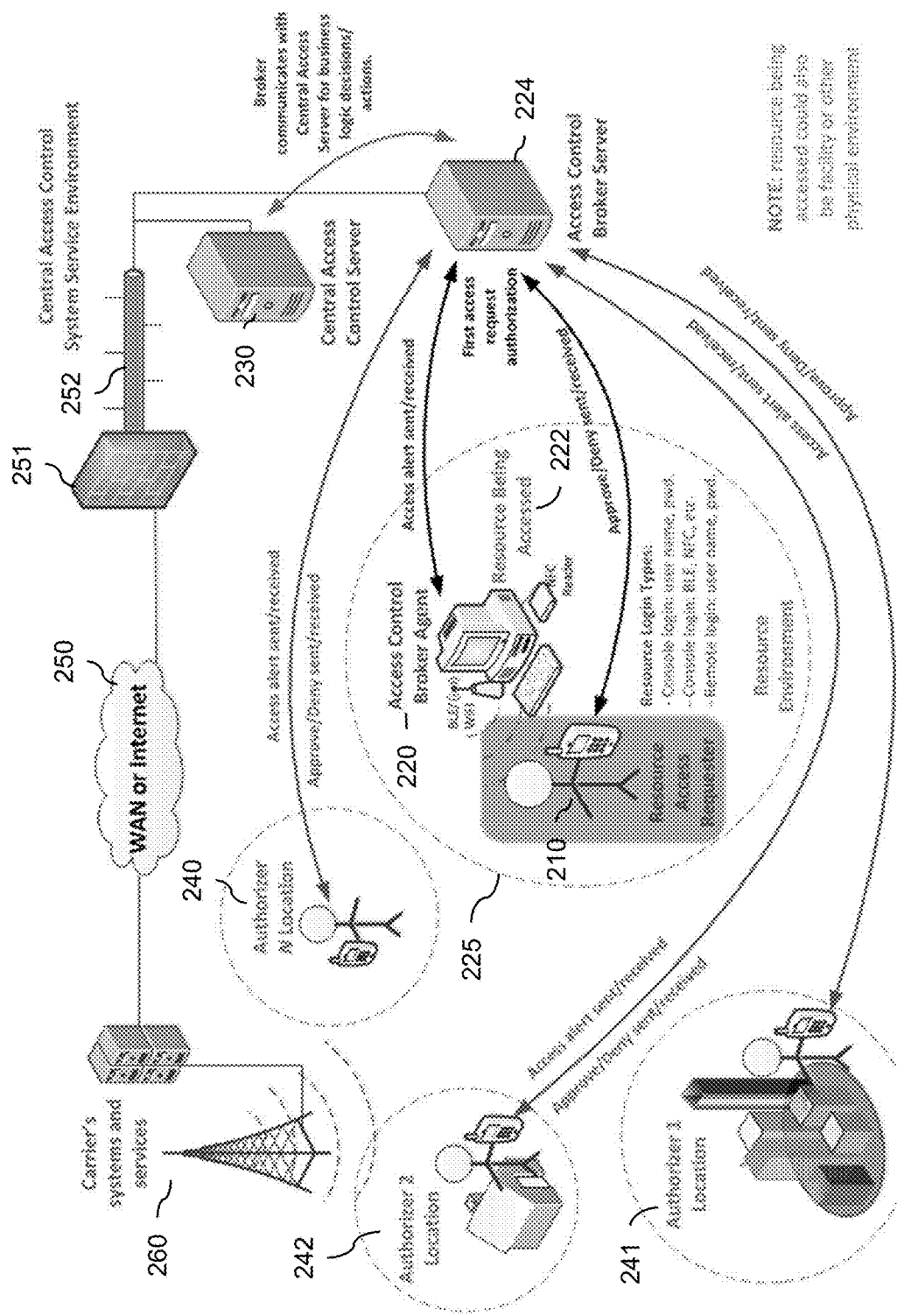
FIG. 1 is a schematic diagram illustrating the overall architecture of a secure access system according to one aspect the present disclosure.

A two-person access authorization rule is typically used in cases where an especially high level of security is needed.

The rule classically required that two authorized people be "present" during a controlled access or action. Implementation of a two-person access authorization rule historically relied on the physical proximity of the authorizing parties to each other, or the use of out-of-band communications mechanisms to give direct verbal authorization to another controlling/coordinating party. Other systems use a business logic oriented software solution which would "hold" a transaction until multiple approvers have agreed to authorize it in subsequent transaction activities. Those solutions do not allow for easy remote and mobile authorization to access electronic resources combining physical-world attributes (e.g. visual, voice, location, etc.) of requesters and human judgment of authorizers to facilitate strong, yet flexible security verification. They also do not tap into the robust secure mobile communications capabilities of today's mobile and cellular technologies to bring a classic and ultimately effective security control mechanism—the two-person rule—into the modern mobile age.

Disclosed is a system for implementing a two-person access control authorization system for accessing computing and network resources. The system uses mobile devices and cellular communications services. As shown in schematic form in FIG. 1, the system includes access control broker agent software 220 that acts as a system access control communication shim and controls actual access to a resource 222. In the embodiment shown, the access control broker agent 220 and the computer resource 222 are integrated at a single location 225, and the access control broker agent 220 communicates with a remotely located access control broker server 224, which acts as a communication gateway and may serve multiple access control broker agents. Alternatively, the access control broker agent 220 may communicate directly with a central access control server 230 and may be located either on-site with the resource 222 or remotely.

While the resource 222 shown in FIG. 1 is a computer resource such as a restricted data file or an application program with restricted access, the resource may alternatively be a resource to which physical access is being controlled, such as equipment, a facility, real property or another physical environment.

The central access control server 230 controls communications and makes access authorization decisions based on business logic and rule sets, and performs logging and reporting. The server may be operated, for example, by a communications network provider as part of an access authorization service. Alternatively, functions of the central access control server 230 may be provided as part of a cloud service offering access authorization. The central access control server 230 connects via a local area network 252 through a firewall 251 to a wide area network such as the Internet 250. The central access control server 230 also communicates with one or more cellular communications systems 260 via the Internet.

Instances of a mobile handset service application (mobile app) run on mobile devices including a mobile device of the resource access requester 210 and a mobile device of an authorizer 240. As described below, depending on the requested resource, additional authorizers 241, 242 at other locations may be required for authorization, as decided by the central access control server 230. The mobile devices may be smart phones or any other portable device capable of running the mobile handset service application and connecting to a communications network. The disclosed solution relies on the security and integrity of the requesting and authorizing users' mobile handsets. Mobile app support for resource log-in using low-range communications standards such as near-field communication (NFC) and BLUETOOTH Low Energy (BLUETOOTH LE) communications standard allows mobile devices running operating systems such as the APPLE iOS mobile operating system or the ANDROID mobile operating system to be used to implement the full disclosed log-in solution.

Figure 2:
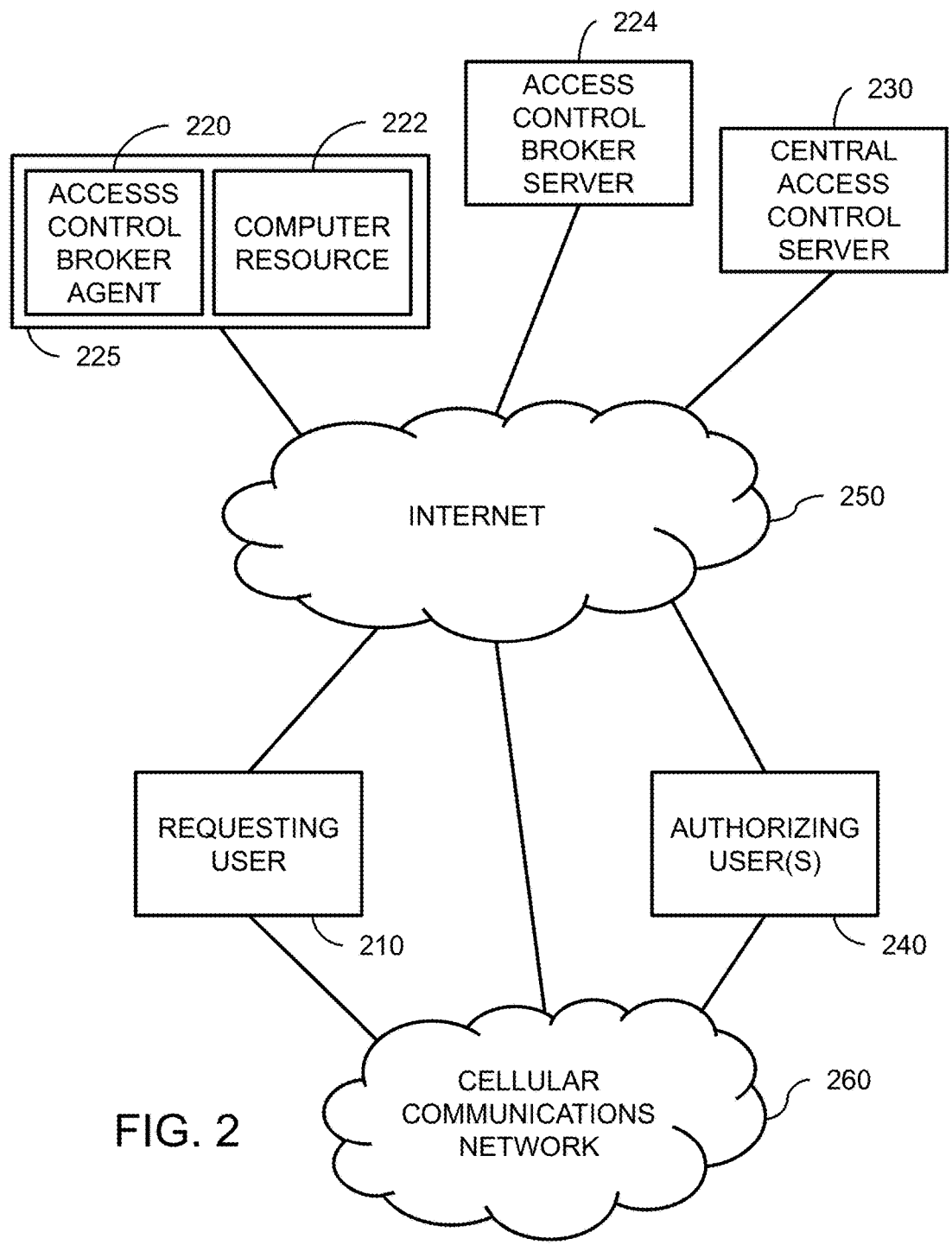
FIG. 2 is a schematic diagram illustrating element connections according to one aspect of the disclosure.

As best shown in FIG. 2, data communications among the central access control server 230, the access control broker agent 220 and the access control broker server 224 may be via the Internet 250 or another wide area network. Some or all of those connections may alternatively be made partly or completely within private local area networks, virtual private networks (VPNs) or along dedicated buses.

Connections to the mobile devices of the requesting user 210 and the authorizing user 240 may be via the cellular communications network 260, and may alternatively or additionally be through the Internet 250, as is the case when a mobile device connects via a wireless local area network such as a WI-FI wireless network. Connections may furthermore be relayed by one or more of the components shown in FIG. 2. For example, a connection between an authorizing user mobile device 240 and the central access control server 230 may pass from the authorizing user mobile device 240 through the cellular communications network 260, through the Internet 250, to the access control broker server 224, which relays the communications through the Internet 250 to the central access control server 230.

A high-level activity work-flow for an access authorization request through the system is now described with reference to FIGS. 3A and 3B. Common element numbers are used to identify common elements in FIGS. 1, 2, 3A and 3B. Arrows are used in FIGS. 1, 3A and 3B to depict communications between elements. While the arrows are shown directly connecting the sending and receiving elements, one skilled in the art will recognize that such communications may pass through or be relayed by other elements, either shown or not shown in the figures.

The process is initiated by a requesting user 210 attempting to access a resource that is protected by the presently described multi-person authorization access control system. In the case of a computer resource, one of several log-in types may be used by the requesting user 210. If the login is a console login, typically performed onsite, the login may be via user name and password, or alternatively via BLUETOOTH LE communications standard or near field communication (NFC) technologies. A remote login may also be performed via user name and password. In any case, an attempted login by a user creates a transaction request 310 to be transmitted to the access control broker agent 220. One aspect of the present disclosure is that the requesting user 210 authorizes the request before the multi-person approvals are requested.

Figure 3A:
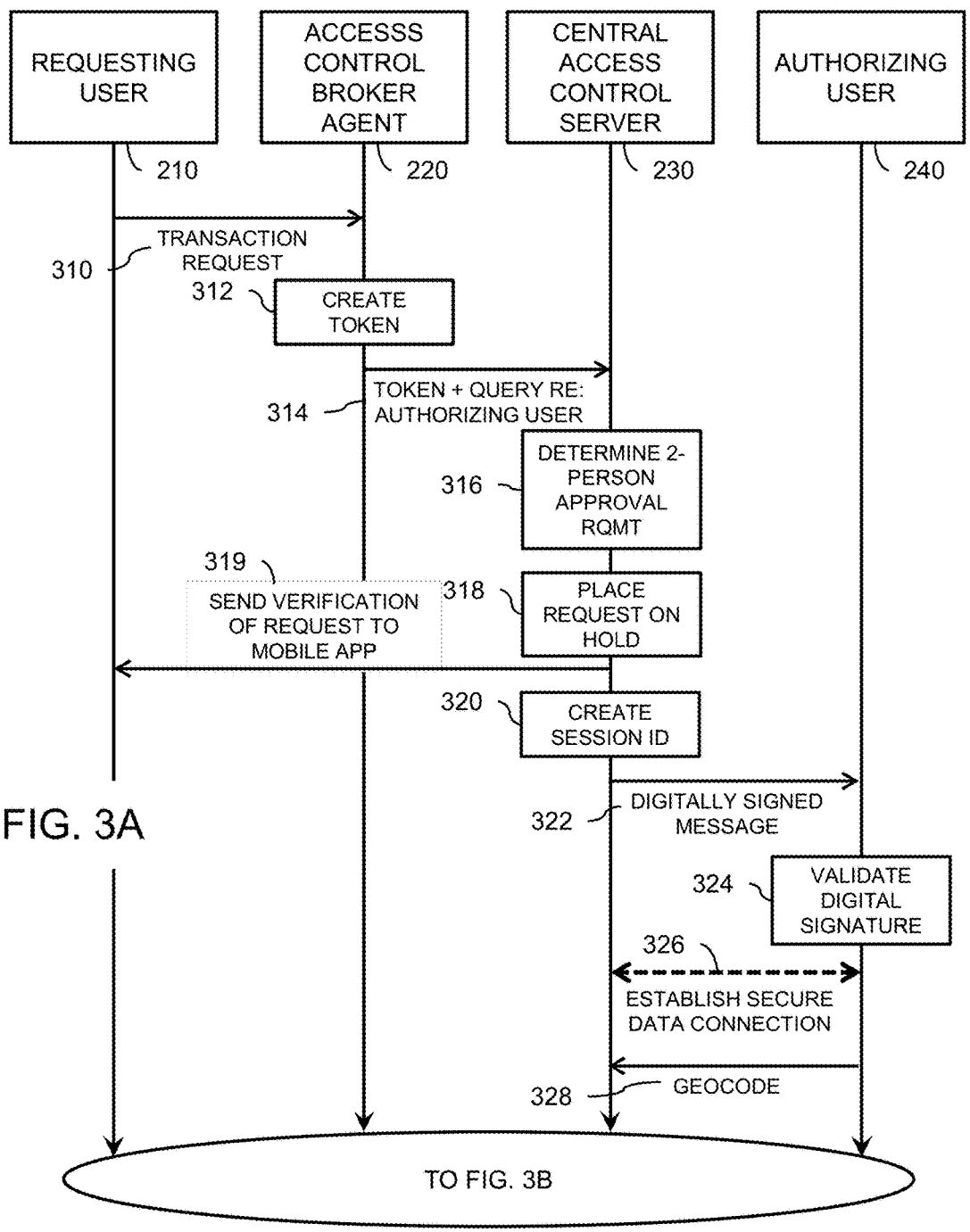

As depicted in FIGS. 3A and 3B, the access control broker agent 220 communicates directly with the central access control server 230. As noted above, however, one or more access control broker agents 220 may communicate with an access control broker server 224 (not shown in FIGS. 3A and 3B) and conduct transactions with the central access control server 230 through the access control broker server 224.

The access control broker agent 220 may create an access request session token 312 to securely identify the transaction request. The access request session token is then transmitted by the access control broker agent 220 to the central access control server 230 in a query 314 requesting authorization to access the resource.

The central access control server 230 makes a determination 316 that the resource to which access is requested requires a two-person authorization and, using rule-system sets, determines authentication and authorization parameters given the requested resources and/or the requesting user(s). The determination gives precedence to resource-specific rules over user rules. Based on that determination, the central access control server 230 places the access request in a hold state 318 until the required authorization process is completed.

The central access control server 230 may transmit to the requesting user 210 a verification 319 that the request has been received. The verification may be directed to a mobile app running on the requesting user's mobile device.

The central access control server 230 creates an authorization request session identifier 320 for use in communicating with the mobile applications residing on the mobile devices of each of the requesting user 210 and the authorizing user 240. The central access control server 230 preferably has access to a database storing a set of pre-established rules pertaining to each protected resource. The rules may, for example, define (a) the number of authorizing users from whom authorization is required to access the resource, (b) the identity of the authorizing users who can authorize access by particular users to particular resources, (c) the permitted geolocations of each authorizing user when providing authorization, (d) the permitted geolocations of a requesting user seeking authorization, (e) a required type of real-time person-to-person communications link to be established between the requesting user and the authorizing users, and (f) other rules as needed under the particular circumstances of a system. Separate sets of rules may be stored for different requesting users. The rules may additionally consider the time of day, the day of the week, patterns of usage of the requesting user, and any other relevant factors.

The central access control server 230 sends a digitally signed contact message 322 to the mobile devices of each of the authorizing users 240 identified in the authorization rules. Each of the authorizing user's mobile applications validate the digital signature 324 and a secure data connection 326 is established between the mobile app and the central access control server 230 using authentication, encryption, and the secure session identifier 320. The secure connection 326 may utilize a heartbeat or periodic message to assure normal operation. A secure connection (not shown) may also be established between the requesting user mobile device 210 and the central access control server 230.

The described arrangement utilizes the security and integrity of the authorizing users' mobile handsets, and further utilizes the security and location-based services of the cellular provider for the handsets. Specifically, mobile handsets are individually identified using unique codes that are typically stored on a subscriber identification module (SIM) card installed in the device. A cellular communications service provider uses that code to verify the identity of the handset for subscription purposes. In addition to the identity of the handset itself, the present authorization system may also use passcodes, voice recognition, biometric data or other identification technology to verify the identities of the requesting user and the authorizing users.

The mobile application running on the device of the authorizing user 240 sends to the central access system the present geocode 328 of the device. The location may be determined by the handset using a global positioning system (GPS). Alternatively, the central access control server 230 may instead query the cellular network service API for the present geo-code of the user's mobile handset, or may utilize another geo-location system. For example, the location of the handset may be determined by the cellular communications system using signal strength and triangulation techniques as is known in the cellular communication art. The location of an authorizing user 240 provides additional information to be used in verifying the identity of the user. For example, if an authorizing user is expected to be at her office during a particular time period of the day, the system will use geocode information to verify that that user is at the expected location, and decline an authorization transmitted from a different location.

The presently disclosed system therefore leverages the form factor commonly used in mobile devices to afford a unique two-factor authentication capability. Specifically, identification codes contained in the device itself, such as those contained on the SIM card, are used in conjunction with the device's geolocation capabilities to provide dual authentication. Additional authenticators may be used. For example, identifiers embedded in the mobile app or in the mobile device may be used to authenticate a user. Biometric analysis of a user's voice patterns or characteristics of a live image of the user may be used as authentication factors. Dedicated biometric input devices, such as fingerprint scanners or retina scanners, may also be used.

Once the identity of the authorizing user has been verified, the central access control server 230 sends details 330 of the transaction request to the mobile applications of the authorizing users 240, for use in a decision whether to grant authorization. Those details may include (1) the authorization request token identifier, (2) an identification of the resource requested, (3) the computer system or other system in which the resource is located, (4) the requestor account user name, (5) the requestor account holder name, (5) the requestor current mobile location, which may comprise a city and state or a current geo code for real time mapping, and (6) a requested session time duration.

The central access control server 230 then establishes a real-time person-to-person communication session 332 between the mobile devices of the requesting user 210 and the authorizing user 240. The person-to-person communication session provides for an important aspect of the two-person rule by permitting the requesting user and the authorizing user to communicate in real time, observing each other's demeanor, etc.

The type of real-time person-to-person communication is defined by the rules database based, for example, on the requested resource, the requesting user, and other relevant factors. In one arrangement, several possible types of person-to-person communication sessions 332 are possible: (1) a video stream connection using the cameras and microphones of the mobile devices, (2) an audio session similar to a telephone conversation, (3) a text conversation using keypads of the mobile devices, and (4) no real-time connection. The video connection is used for more critical authorizations involving sensitive resources; the audio connection is used for authorizations of intermediate sensitivity, and the texting connection is used for more routine authorizations. No live connection is used in processing requests to access low-importance resources.

In an alternative arrangement, the applications running on the users' mobile devices may decide the type of real-time person-to-person communication to be implemented based on available resources. For example, in a region of poor cellular coverage or slow data throughput, the video conference option may be made unavailable. In that case, the central access control server 230 may establish a minimum connection type below which authorization is not permitted.

The video conference requirement may also be based on any defined geo-fences established for requesting or authorizing parties in the rule set; e.g., if the requesting user handset is located outside of a defined geographic region, then require a video authorization session.

The live person-to-person connection 332 may be used by the parties to explain the purpose of the access to the resource, to ask questions, discuss alternatives, etc. The connection 332 between mobile devices may also provide a conduit for additional out-of-band authenticators or indicators of duress that may be relevant in making an authorization decision. For example, characteristics of the person-to-person communication feed such as verbal, visual, vocal stress or other biometric sensing may be automatically sensed or computed and presented to the authorizing user for consideration in deciding whether to authorize access.

In one aspect of the system, the authorizing user 240 may use the mobile application to choose to manually request a live video stream confirmation between the requesting and authorizing users assigned to the transaction. That option provides the authorizing user with the ability to act on additional information not covered by the stored rules, in which a direct conversation is deemed appropriate.

The authorizing user 240 assigned to the transaction then elects in the mobile application to either Authorize or Decline the access request; and the authorization 334 (or denial) is sent back to the central access control server 230. The authorization may include using single or multiple authentication mechanisms on the mobile handset and/or mobile application, such as application password, a secure screen lock, biometrics, etc. The authorization may require authentication at the time of authorization, or may rely on an authentication performed at the beginning of the session. In addition to providing buttons to either approve or deny, the application may also provide buttons to flag a request for follow-up or secondary audit review later on.

The central access control server 230 uses logic based on the authorization request rules to make a determination 336 whether the access request is to be approved or denied. The central access control server then sends an authorization response 338 for the requested transaction to the access control broker agent 220.

The access control broker agent 220 changes the status of the access request transaction from "hold" to either "approved" or "denied" at block 340. If approved, access control broker agent 220 grants the requesting user access 342 to the requested resources. Access control broker agent 220 then logs and audits the transaction at block 344, and tracks any session expiration requirements defined for the transaction session.

Figure 4:
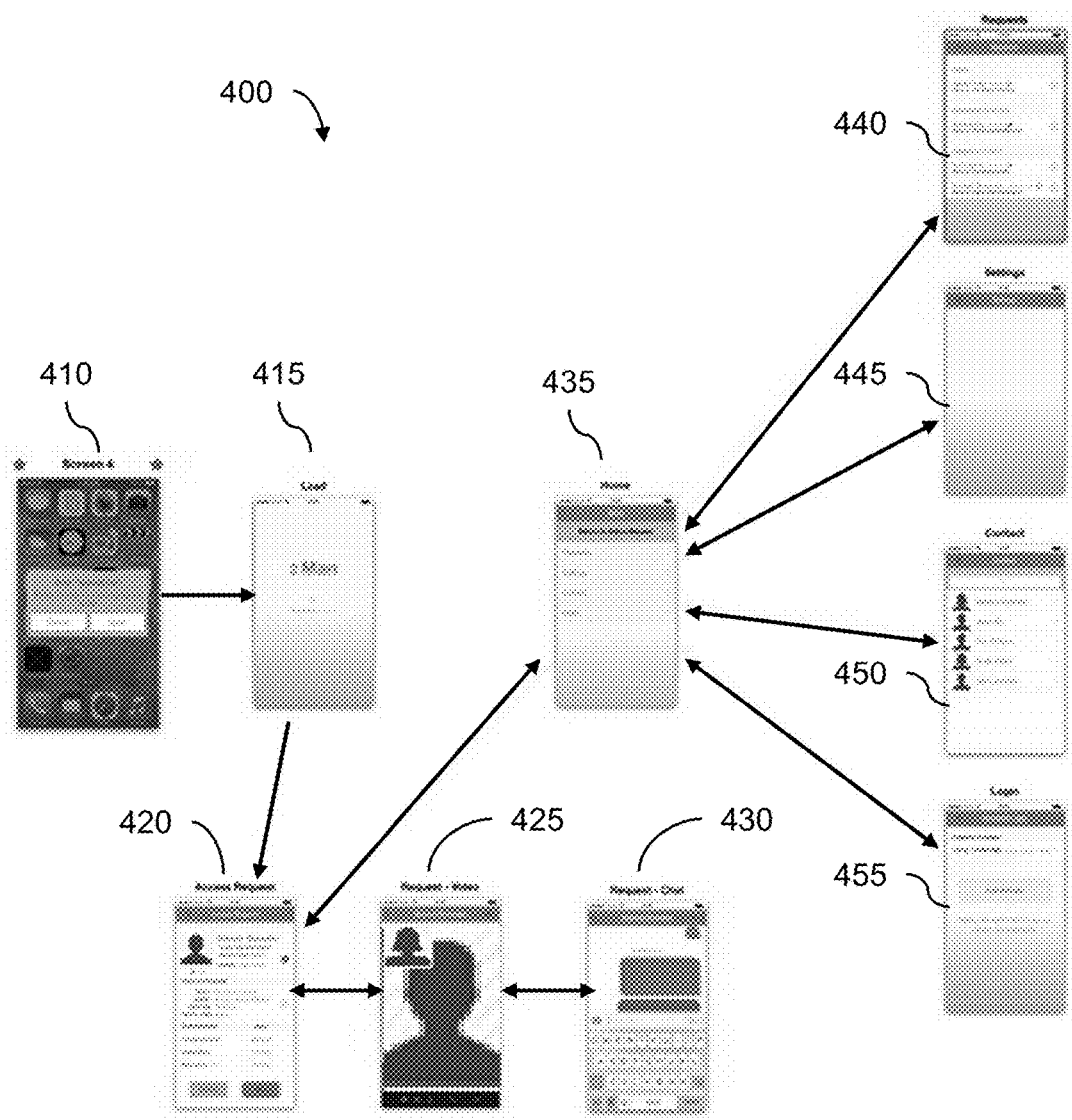
FIG. 4 is a screen flow map showing screen sequences of an authorizer app according to one aspect the present disclosure.
Figure 5:
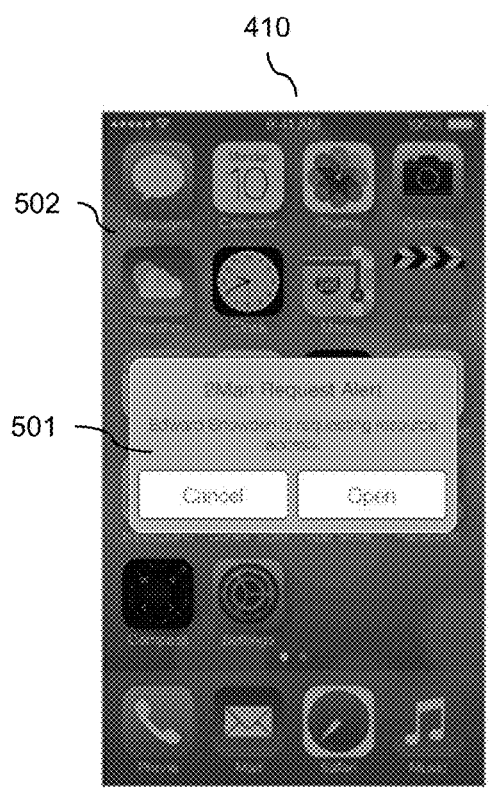
FIG. 5 shows a screen of the authorizer app of FIG. 4 according to one aspect the present disclosure.

The screen flow map 400 of FIG. 4 shows a sequence of screens presented by an example mobile application running on users' mobile devices in accordance with the present disclosure. An alert 410, shown in more detail in FIG. 5, contains a "push" type alert 501 that is superimposed over a current active user screen 502. The alert 501 "pops up" when a requesting user requests resource access. The alert may contain information such as the identity of the requesting user, and may offer options allowing the authorizing user to "cancel" or open" the request.

Figure 6:
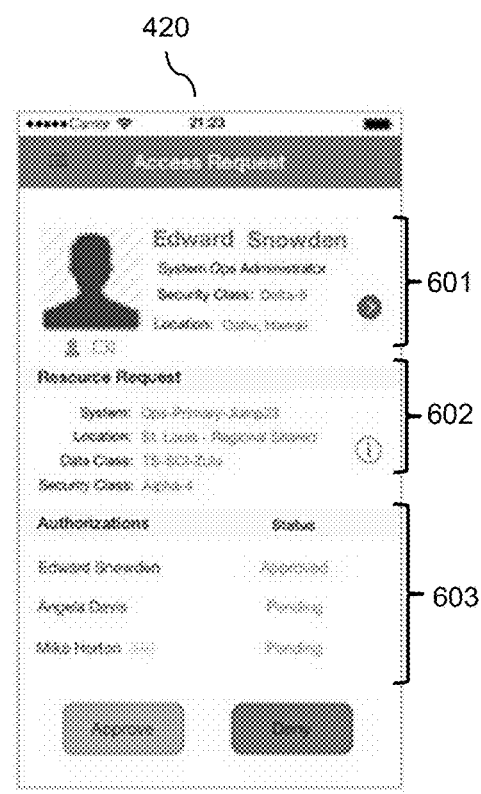
FIG. 6 shows another screen of the authorizer app of FIG. 4 according to one aspect the present disclosure.

If the request is opened, a "load" screen 415 is presented momentarily, followed by an access request details screen 420, shown in more detail in FIG. 6. The screen 420 may contain details about the requestor 601 and details about the requested resource 602. Each of the requestor section 601 and the resource section 602 may include a button for requesting more detailed information. Additionally, the screen 420 may include a list of other authorization requests and their statuses 603.

The requestor section 601 of screen 420 may contain a series of buttons, each for establishing one type of person-to-person connection with the requestor. The buttons may be colored or highlighted to indicate that a particular person-to-person connection type (e.g., video conference or audio-only) is required or is not required by the rules governing the subject authorization request.

Figure 7:
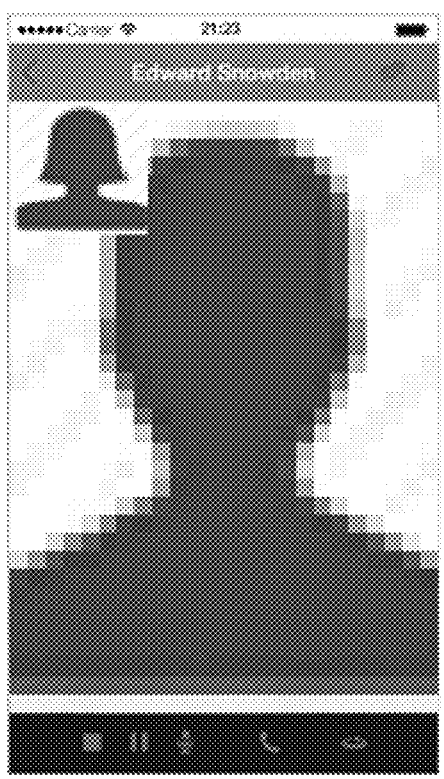
FIG. 7 shows another screen of the authorizer app of FIG. 4 according to one aspect the present disclosure.
Figure 8:
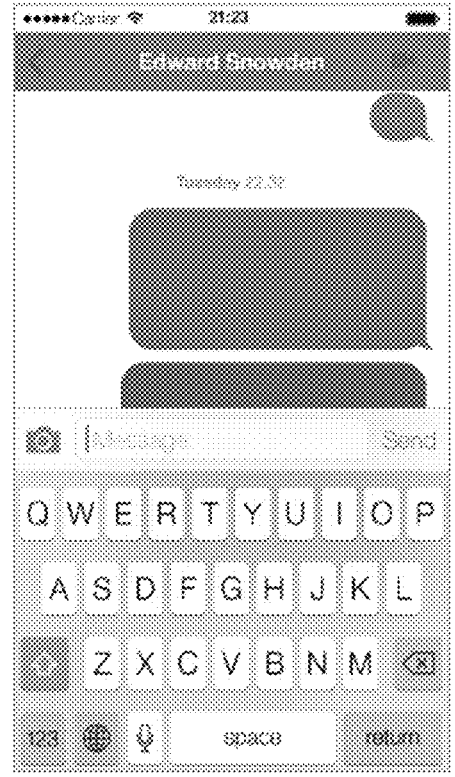
FIG. 8 shows another screen of the authorizer app of FIG. 4 according to one aspect the present disclosure.

A screen 425 (FIG. 7) is provided within the app for conducting a video conference between the requesting user and the authorizing user. That screen loads after the video conference button presented in section 601 of screen 420 is pushed. Similarly, a screen 430 (FIG. 8) is provided within the app for conducting a text messaging session between the requesting user and the authorizing user.

Figure 9:
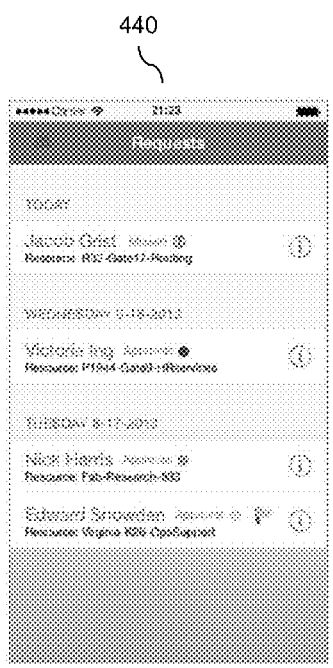
FIG. 9 shows another screen of the authorizer app of FIG. 4 according to one aspect the present disclosure.

Returning to FIG. 4, a home screen 435 may be accessed from most other screens in the app using a standard "home screen" button. From the home screen, a user may access a "requests" screen 440 (FIG. 9) to review pending requests for authorization. The screen may contain a list of pending or recent requests, together with additional information such as status and requestor. The home screen may also provide navigation to a "settings" screen 445 (FIG. 4) used in customizing the app for particular users.

Figure 10:
FIG. 10 shows another screen of the authorizer app of FIG. 4 according to one aspect the present disclosure.

A contact list screen 450 (FIG. 10) provides a compiled list of contacts used within the app, together with contact and authentication information used in communicating with those individuals.

Figure 11:
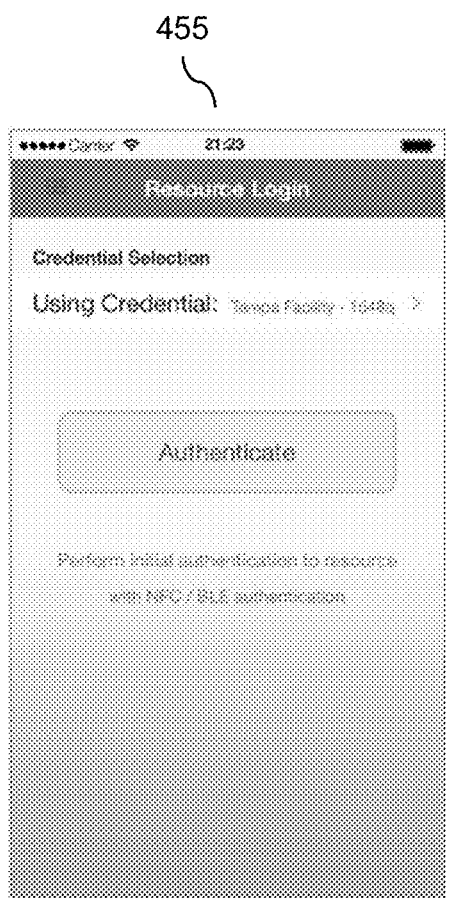
FIG. 11 shows another screen of the authorizer app of FIG. 4 according to one aspect the present disclosure.

A resource log-in screen 455 (FIG. 11) is used by the requesting user to log in to a particular resource after access authorization has been granted. The app provides to the resource credentials received from the central access control server 230 that are used in logging in to the resource.

Figure 12:
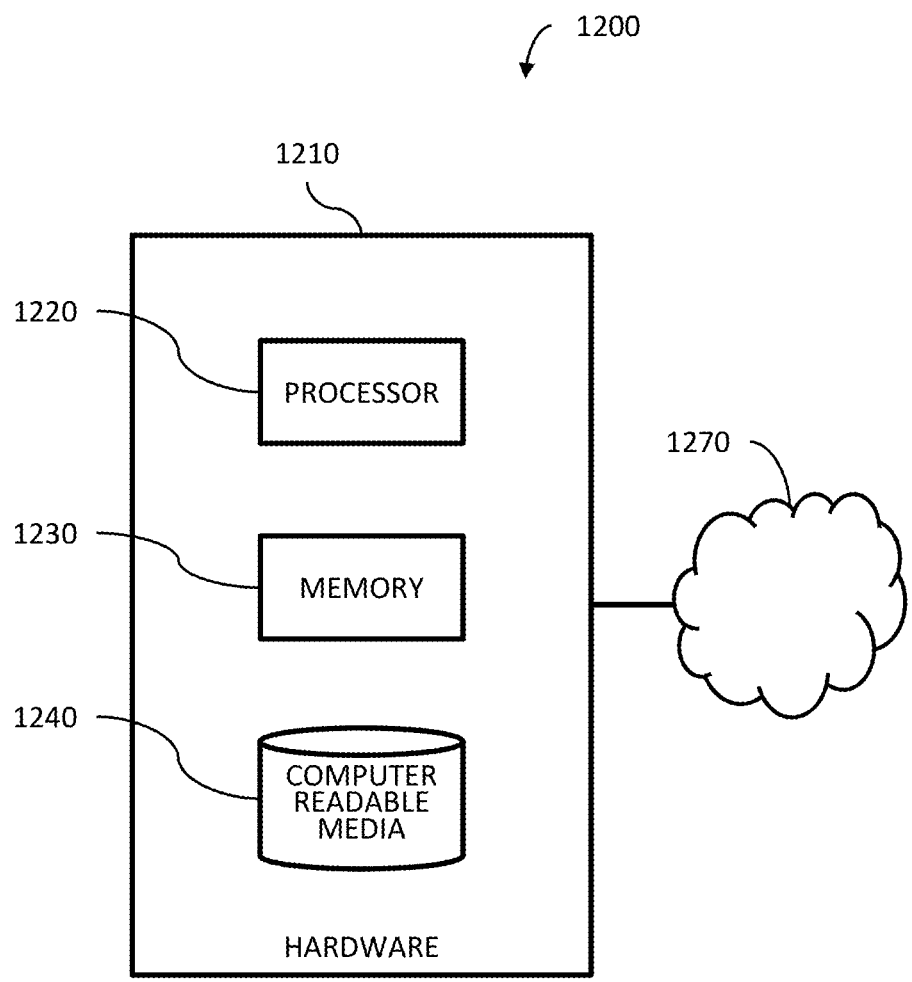
FIG. 12 shows an exemplary computing system upon which the described secure access system may be instantiated.

The elements of the methodology as described above may be implemented in computer hardware comprising a plurality of units linked by a network or a bus. For example, the central access control server, the access control broker server, the access control broker agent and the mobile devices described above may each be instantiated using computing systems such as the exemplary computing system 1200 is shown in FIG. 12.

Computing hardware 1210 may be a mainframe computer, a desktop or laptop computer or any other device or group of devices capable of processing data. The computing hardware 1210 receives data from any number of data sources that may be connected to the apparatus. For example, the computing apparatus 410 may receive input from a wide area network 1270 such as the Internet, via a local area network or via a direct bus connection.

The computing hardware 1210 includes one or more processors 1220 such as a central processing unit (CPU) and further includes a memory 1230. The processor 1220 is configured using software according to the present disclosure.

The memory 1230 may include a random access memory (RAM) and a non-volatile memory such as an electrically erasable programmable read-only memory (EEPROM). The memory may also include removable media such as a disk drive, tape drive, memory card, etc., or a combination thereof. The RAM functions as a data memory that stores data used during execution of programs in the processor 1220; the RAM is also used as a program work area. The EEPROM functions as a program memory for storing a program executed in the processor 1220. The program may reside on the EEPROM or on any other tangible, non-volatile computer-readable media 1240 as computer readable instructions stored thereon for execution by the processor to perform the operations.

Generally, the processor 1220 is configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ distributed computing environments, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software and the computer program code required to implement the foregoing can be developed by a person of ordinary skill in the art.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude propagated signals, which are not tangible and are not non-transitory. Cached information is considered to be stored on a computer-readable medium. Common expedients of computer-readable media are well-known in the art and need not be described in detail here.

The described solution provides a dynamic, mobile system for facilitating two-person rule access authorization to computing resources. It uniquely allows for remote and mobile authorizations; and combines modern aspects of mobile cellular interfaces and location service technologies with more classic security control measures of voice and visual verification of user identities.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for granting access to a resource, comprising:
by a central access authorization system, receiving from an access control broker agent a request for a grant of authorization for a requestor to access a resource, the request including request information about the requestor and the resource;
by the central access authorization system, in response to the receiving the request for the grant of authorization, applying a set of stored authorization rules covering the request information;
wherein the set of stored authorization rules being based at least in part on a sensitivity of the resource;
wherein applying the set of stored authorization rules being to select a type of person-to-person communication session between a mobile device of the requestor and a mobile device of an authorizing user required for the grant of authorization;
wherein the type of person-to-person communication session required for the grant of authorization is selected from a group including a texting communication session used for resources of routine sensitivity, a real-time audio communication session used for resources of intermediate sensitivity, and a real-time video communication session used for resources of critical sensitivity;
by the central authorization system, establishing a person-to-person communication session for the grant of authorization between the mobile devices of the requestor and the authorizing user;
providing to the authorizing user additional information not covered by the set of stored authorization rules;
by the central access authorization system, after the providing the additional information to the authorizing user, receiving from an authorizer mobile app running on the mobile device of the authorizing user, a manual request to establish a real-time video person-to-person communications session between the mobile device of the requestor and the mobile device of the authorizing user;
by the central access authorization system, in response to the manual request, establishing the real-time video person-to person communications connection between the mobile device of the requestor and the mobile device of the authorizing user, permitting the requestor and the authorizing user to communicate in real-time;
by the central access authorization system, subsequent to the establishing the real-time video person-to-person communications session, receiving an authorization message from the authorizer mobile app; and
by the central access authorization system, based on the authorization message and based on the set of stored authorization rules, transmitting to the access control broker agent a message granting access to the resource by the requestor.

2. The method of claim 1, further comprising:
receiving from the authorizer mobile app geolocation data pertaining to the mobile device of the authorizing user; and
wherein the set of stored authorization rules include a rule requiring the geolocation data to indicate an expected location of the authorizing user before the access to the resource is granted.

3. The method of claim 1 wherein the method further comprises:
receiving geolocation data pertaining to the mobile device of the requestor; and
wherein the set of stored authorization rules include a rule requiring the geolocation data to indicate an expected location of the requestor before the access to the resource is granted.

4. The method of claim 1 further comprising:
by the central access authorization system, determining a biometric indicator from the person-to-person communication session between the mobile device of the requestor and the mobile device of the authorizing user; and wherein the set of stored authorization rules include a rule requiring the biometric indicator to identify one of the requestor and the authorizing user before the access to the resource is granted.

5. The method of claim 1, further comprising:
by the central access authorization system, generating an authorization request session identifier for processing the request for the grant of authorization;
transmitting to the authorizer mobile app a digitally signed contact message including the authorization request session identifier.

6. A central access authorization system comprising:
a processor;
a wide area network interface connected to the processor; and
a computer readable storage device having stored thereon computer readable instructions that, when executed by the processor, cause the processor to perform operations comprising:
receiving from an access control broker agent a request for a grant of authorization for a requestor to access a resource, the request including request information about the requestor and the resource;
retrieving a set of stored authorization rules covering the request information;
in response to the receiving the request for the grant of authorization, applying a set of stored authorization rules covering the request information;
wherein the set of stored authorization rules being based at least in part on a sensitivity of the resource;
wherein applying the set of stored authorization rules being to select a type of person-to-person communication session between a mobile device of the requestor and a mobile device of an authorizing user required for the grant of authorization;
wherein the type of person-to-person communication session required for the grant of authorization is selected from a croup including a texting communication session used for resources of routine sensitivity, a real-time audio communication session used for resources of intermediate sensitivity, and a real-time video communication session used for resources of critical sensitivity;
establishing a person-to-person communication session for the grant of authorization between the mobile devices of the requestor and the authorizing user;
providing to the authorizing user additional information not covered by the set of stored authorization rules;
after the providing the additional information to the authorizing user, receiving from an authorizer mobile app running on the mobile device of the authorizing user, a manual request to establish a real-time video person-to person communications session between the mobile device of the requestor and the mobile device of the authorizing user;
in response to the manual request, establishing the real-time video person-to person communications connection between the mobile device of the requestor and the mobile device of the authorizing user, permitting the requestor and the authorizing user to communicate in real-time;
subsequent to the establishing the real-time video person-to-person communications session, receiving an authorization message from the authorizer mobile app; and based on the authorization message and based on the set of stored authorization rules, transmitting to the access control broker agent a message granting access to the resource by the requestor.

7. The central access authorization system of claim 6, wherein the operations further comprise:
receiving from the authorizer mobile app geolocation data pertaining to the mobile device of the authorizing user; and
wherein the set of stored authorization rules include a rule requiring the geolocation data to indicate an expected location of the authorizing user before the access to the resource is granted.

8. The central access authorization system of claim 6 wherein the operations further comprise:
receiving geolocation data pertaining to the mobile device of the requestor; and
wherein the set of stored authorization rules include a rule requiring the geolocation data to indicate an expected location of the requestor before the access to the resource is granted.

9. The central access authorization system of claim 6 wherein the operations further comprise:
by the central access authorization system, determining a biometric indicator from the person-to-person communication session between the mobile device of the requestor and the mobile device of the authorizing user; and
wherein the set of stored authorization rules include a rule requiring the biometric indicator to identify one of the requestor and the authorizing user before the access to the resource is granted.

10. The central access authorization system of claim 6, wherein the operations further comprise:
generating an authorization request session identifier for processing the request for the grant of authorization; and
transmitting to the authorizer mobile app a digitally signed contact message including the authorization request session identifier.

11. A tangible computer-readable medium having stored thereon computer readable instructions for granting access to a resource, wherein execution of the computer readable instructions by a processor causes the processor to perform operations comprising:
receiving from an access control broker agent a request for a grant of authorization for a requestor to access a resource, the request including request information about the requestor and the resource;
in response to the receiving the request for the grant of authorization, applying a set of stored authorization rules covering the request information;
wherein the set of stored authorization rules being based at least in part on a sensitivity of the resource;
wherein applying the set of stored authorization rules being to select a type of person-to-person communication session between a mobile device of the requestor and a mobile device of an authorizing user required for the grant of authorization;
wherein the type of person-to-person communication session required for the grant of authorization is selected from a group including a texting communication session used for resources of routine sensitivity, a real-time audio communication session used for resources of intermediate sensitivity, and a real-time video communication session used for resources of critical sensitivity;

establishing a person-to-person communication session for the grant of authorization between the mobile devices of the requestor and the authorizing user;

providing to the authorizing user additional information not covered by the set of stored authorization rules;

after the providing the additional information to the authorizing user, receiving from an authorizer mobile app running on the mobile device of the authorizing user, a manual request to establish a real-time video person-to person communications session between the mobile device of the requestor and the mobile device of the authorizing user;

in response to the manual request, establishing the real-time video person-to person communications connection between the mobile device of the requestor and the mobile device of the authorizing user, permitting the requestor and the authorizing user to communicate in real-time;

subsequent to the establishing the real-time video person-to-person communications session, receiving via a secure connection an authorization message from the authorizer mobile app; and based on the authorization message and based on the set of stored authorization rules, transmitting to the access control broker agent a message granting access to the resource by the requestor.

12. The tangible computer-readable medium of claim 11, wherein the operations further comprise:

receiving from the authorizer mobile app geolocation data pertaining to the mobile device of the authorizing user; and wherein the set of stored authorization rules include a rule requiring the geolocation data to indicate an expected location of the authorizing user before the access to the resource is granted.

13. The tangible computer-readable medium of claim 11 wherein the operations further comprise:

receiving geolocation data pertaining to the mobile device of the requestor; and wherein the set of stored authorization rules include a rule requiring the geolocation data to indicate an expected location of the requestor before the access to the resource is granted.

* * * * *